(12) United States Patent
Querbach et al.

(10) Patent No.: US 11,074,151 B2
(45) Date of Patent: Jul. 27, 2021

(54) PROCESSOR HAVING EMBEDDED NON-VOLATILE RANDOM ACCESS MEMORY TO SUPPORT PROCESSOR MONITORING SOFTWARE

(71) Applicant: Intel Corporation, Santa Clara, CA (US)

(72) Inventors: Bruce Querbach, Beaverton, OR (US); Christopher Connor, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 424 days.

(21) Appl. No.: 15/940,966

(22) Filed: Mar. 30, 2018

(65) Prior Publication Data

US 2019/0042383 A1 Feb. 7, 2019

(51) Int. Cl.
| | | |
|---|---|---|
| G06F 11/34 | (2006.01) | |
| G06F 11/00 | (2006.01) | |
| G06F 11/30 | (2006.01) | |
| G06F 11/14 | (2006.01) | |

(52) U.S. Cl.
CPC ........ *G06F 11/3409* (2013.01); *G06F 11/008* (2013.01); *G06F 11/3024* (2013.01); *G06F 11/3062* (2013.01); *G06F 11/1441* (2013.01)

(58) Field of Classification Search
CPC .............. G06F 11/3409; G06F 11/008; G06F 11/3024; G06F 11/3062; G06F 11/1441
See application file for complete search history.

(56) References Cited

U.S. PATENT DOCUMENTS

| | | | |
|---|---|---|---|
| 9,015,455 B2 | 4/2015 | Held et al. | |
| 9,041,146 B2 | 5/2015 | Lee et al. | |
| 9,660,181 B2 | 5/2017 | Lee et al. | |
| 2009/0307714 A1* | 12/2009 | Hoover | ................... H04L 45/00 719/314 |
| 2009/0327684 A1 | 12/2009 | Zimmer et al. | |
| 2009/0327741 A1 | 12/2009 | Zimmer et al. | |
| 2010/0169633 A1 | 7/2010 | Zimmer et al. | |
| 2011/0082971 A1 | 4/2011 | Berke | |
| 2011/0145934 A1* | 6/2011 | Abramovici | ............ G06F 21/76 726/30 |
| 2011/0271141 A1* | 11/2011 | Kursun | ............... G06F 11/0793 714/6.3 |
| 2012/0063191 A1 | 3/2012 | Norman | |
| 2012/0191964 A1 | 7/2012 | Lee et al. | |
| 2013/0145080 A1* | 6/2013 | Grandin | .............. G06F 12/0246 711/103 |
| 2013/0304980 A1 | 11/2013 | Nachimuthu et al. | |
| 2014/0264668 A1 | 9/2014 | Lee et al. | |
| 2014/0264679 A1 | 9/2014 | Lee et al. | |
| 2015/0095565 A1 | 4/2015 | Morris et al. | |
| 2015/0188033 A1 | 7/2015 | Lamborn et al. | |
| 2016/0203085 A1 | 7/2016 | Kranich et al. | |
| 2017/0069054 A1* | 3/2017 | Ramadoss | ................. G06T 1/60 |
| 2017/0160338 A1 | 6/2017 | Connor et al. | |

(Continued)

*Primary Examiner* — Manuel L Barbee
(74) *Attorney, Agent, or Firm* — Compass IP Law PC

(57) ABSTRACT

A method is described. The method includes monitoring reliability, power consumption and performance of a processor and writing reliability, power consumption and performance data of the processor into an embedded non-volatile random access memory that is integrated into the processor's semiconductor chip.

20 Claims, 6 Drawing Sheets

(56) References Cited

U.S. PATENT DOCUMENTS

| | | |
|---|---|---|
| 2018/0088862 A1 | 3/2018 | Covington et al. |
| 2018/0190350 A1 | 7/2018 | Connor et al. |
| 2018/0232171 A1* | 8/2018 | Berke .................. G06F 3/0634 |
| 2019/0043570 A1 | 2/2019 | Querbach et al. |

* cited by examiner

PROCESSOR HAVING EMBEDDED NON-VOLATILE RANDOM ACCESS MEMORY TO SUPPORT PROCESSOR MONITORING SOFTWARE

FIELD OF INVENTION

The field of invention pertains generally to the computing sciences and, more specifically, to a processor having embedded non-volatile random access memory to support processor monitoring software.

BACKGROUND

Modern processors commonly execute low level software that is designed to monitor one or more of the processor's predicated failure time (reliability), power consumption and run-time performance.

For instance, such low-level software may execute reliability equations that determine failure rates for the processor and/or expected processor lifetime. Similarly, low-level software may also determine the processor's power consumption from applied supply voltage(s), current draw(s) and/or temperature(s) of the processor. In the case of run-time performance, large amounts of statistics and/or other information are typically generated by the processor to "report out" the characteristics of its run-time performance (e.g., error logs, instructions executed per unit time, memory accesses per unit time, etc.).

A problem is that each of the reliability, power consumption and run-time performance software programs may rely upon non-volatile memory or storage in some fashion. For example, in the case of reliability and power consumption calculations, values for specific coefficients that appear in the reliability and/or power consumption equations may be uniquely determined for the processor based upon parametric measurements made on the processor during its manufacture.

Such coefficients are then shipped with the processor and embedded in the basic input/output system (BIOS) non volatile memory of the computer that the processor is integrated within. During run-time these coefficients are called up from BIOS so that the reliability and power consumption equations can be properly executed. Moreover, any of the reliability, power consumption and performance statistics algorithms may store their results in non-volatile memory in order to persist the data (ensure it is not lost in case of a power-down event).

Here, the reliance on non-volatile memory which is physically separated from the processor semiconductor chip (such as a BIOS FLASH memory chip or a non-volatile mass storage device (e.g., a hard disk drive, a solid state drive (SSD), etc.)) corresponds to inefficiency of implementation and increased risk of failure.

For instance, if the processor frequently needs access to the coefficients in non volatile memory, the processor may spend considerable amounts of time waiting to receive the coefficients from physically separate non volatile memory. Additionally, the reporting out of any of reliability, power consumption or performance statistics may introduce traffic congestion within the system as large amounts of information need to be physically transported from the processor or system memory to non volatile memory. Moreover, if a power down occurs during the transfer before the information can be written to non volatile memory, the information will be lost. In the case of that event, conservative reliability assumptions have to be made, meaning, the device will have assumed reliability assumptions which are likely more pessimistic than reality. The allowed maximum performance would then detrimentally be reduced in response.

FIGURES

A better understanding of the present invention can be obtained from the following detailed description in conjunction with the following drawings, in which.

DETAILED DESCRIPTION

Figure 1:
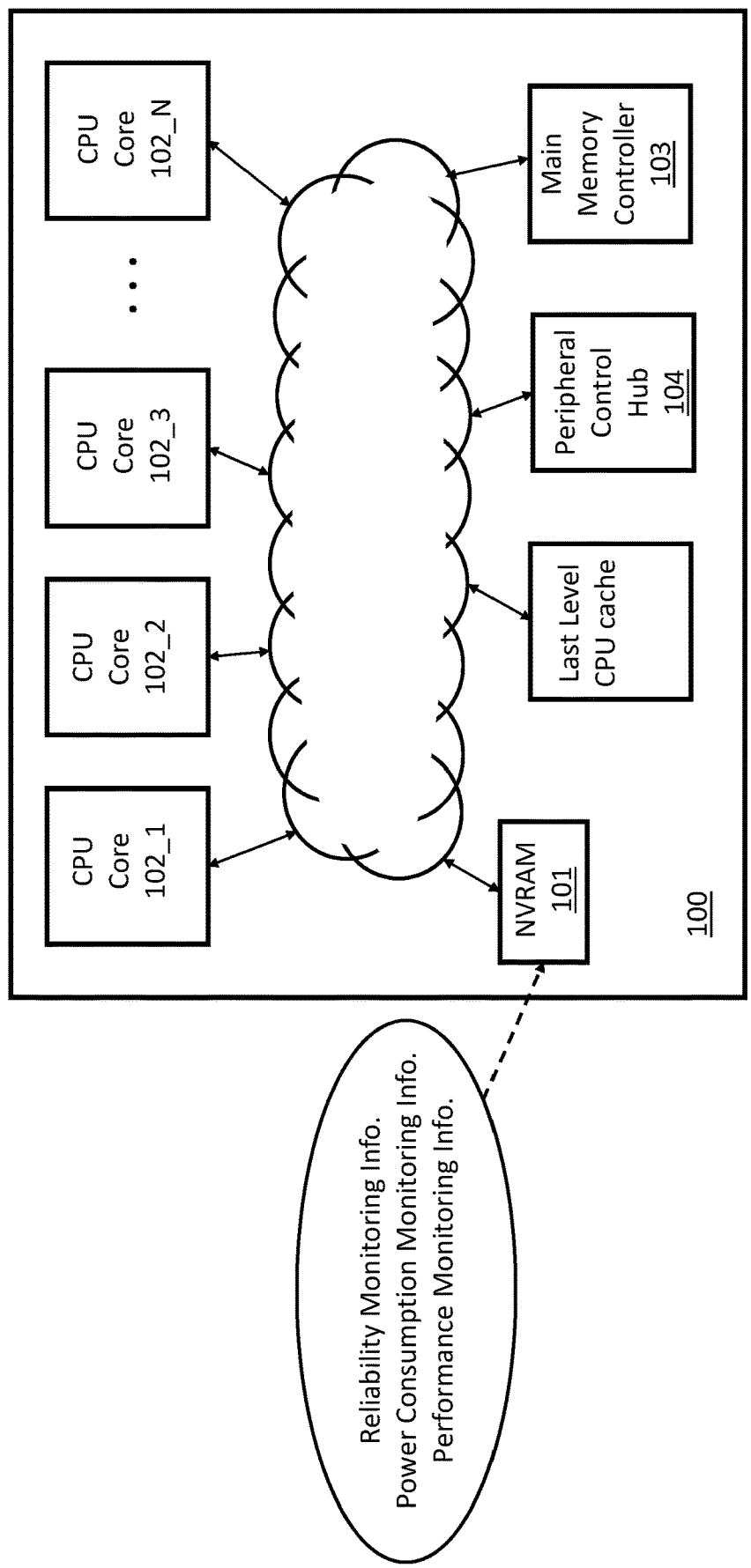
FIG. 1 shows a processor having embedded NVRAM.

FIG. 1 shows an improved approach in which the processor semiconductor chip 100 is designed to include a region of embedded non-volatile memory 101 (e.g., embedded non-volatile random access memory (eNVRAM)) that is used to store information utilized by any low-level reliability, power consumption or performance monitoring software program that executes on the processor 100.

Here, as is known in the art, a modern processor semiconductor chip typically includes other components of a complete computing system. For example, as seen in FIG. 1, a processor semiconductor chip 100 typically includes a number of central processing unit (CPU) processing cores 102_1 through 102_N (which execute software program code instructions), a main memory controller 103 (to interface the computing system's main memory), a peripheral control hub 104 (to interface with peripherals of the computing system (e.g., a display, a keyboard, a printer, non-volatile mass storage, network interfaces (such as an Ethernet interface and/or wireless network interface), etc.) and possibly a special purpose processor (not depicted in FIG. 1) to offload specialized and/or numerically intensive computations from the CPU cores (such as a graphics processing unit (GPU) and/or a digital signal processor (DSP)).

Importantly, as mentioned above, the improved processor semiconductor chip 100 of FIG. 1 includes a region embedded non volatile random access memory (NVRAM) 101. For a number of years the semiconductor chip manufacturing industry has been working on emerging non-volatile memory technologies such as Ferroelectric random access memory (FeRAM), dielectric random access memory, resistive random access memory (ReRAM), Memristor random access memory, phase-change random access memory, three-dimensional crosspoint random access memory, magnetic random access memory (MRAM), spin-torque transfer magnetic random access memory (STT-MRAM), etc.

A number of these technologies can be integrated into a high density logic circuit manufacturing process such as a manufacturing process used to manufacture a processor semiconductor chip 100 as depicted in FIG. 1. For instance, the storage cells of an emerging non-volatile memory may store different resistive states (the cell exhibits a higher resistance or a lower resistance depending on whether it has been programmed with a 1 or a 0) and reside in the metallurgy of the semiconductor chip above the semiconductor substrate.

Here, for instance, a storage cell may reside between orthogonally directed metal wires and a three-dimensional cross-point structure may be realized by stacking cells and their associated orthogonal wiring in the semiconductor chip's metallurgy. Additionally, the access granularities may be much finer grained than traditional non volatile storage (which traditionally accesses data only in large sector or block based accesses). That is, an emerging non volatile memory may be designed to act as a true random access memory that can support data accesses at byte level granularity or some modest multiple thereof per address value that is applied to the memory.

Figure 2:
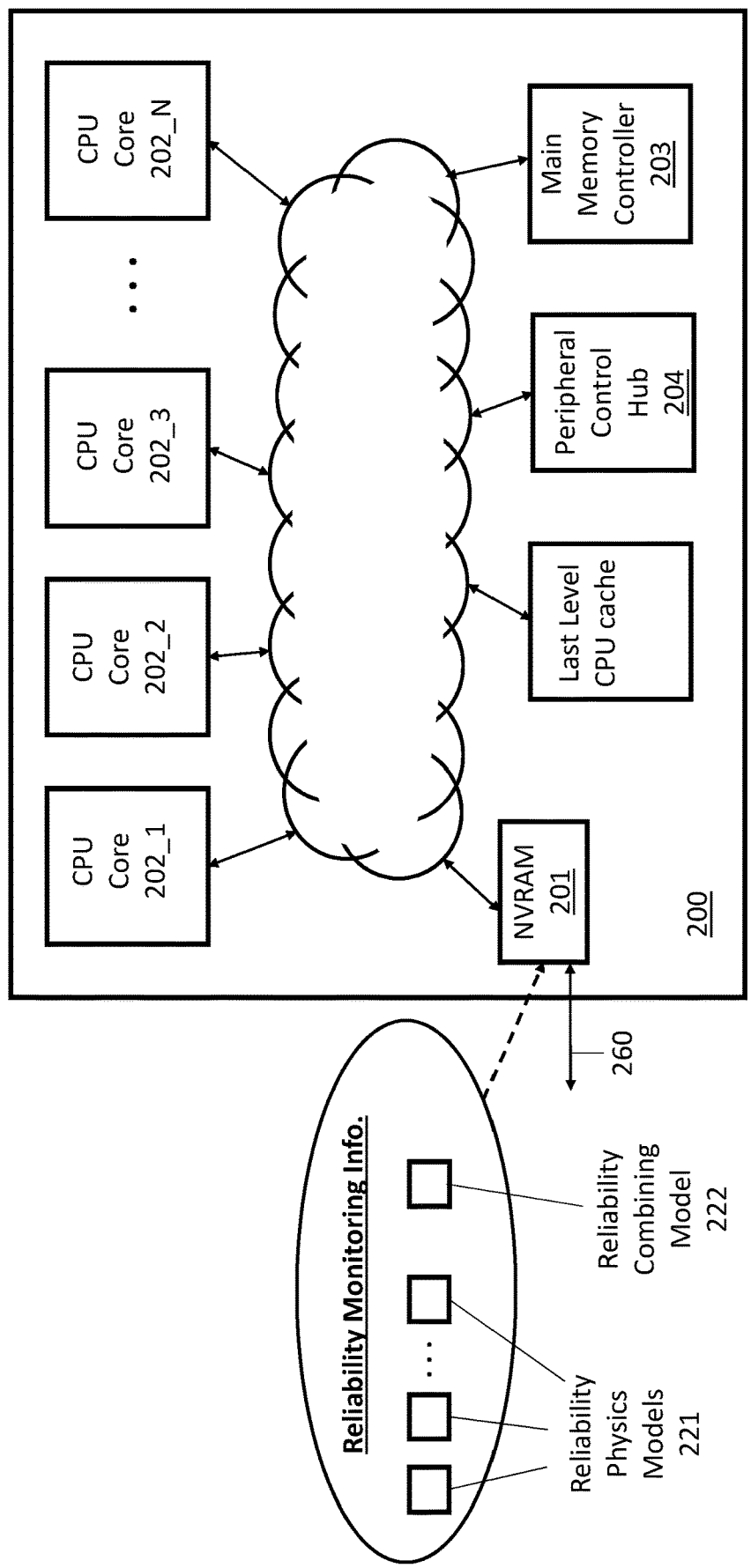
FIG. 2 shows a reliability monitoring system that uses embedded NVRAM.
Figure 3:
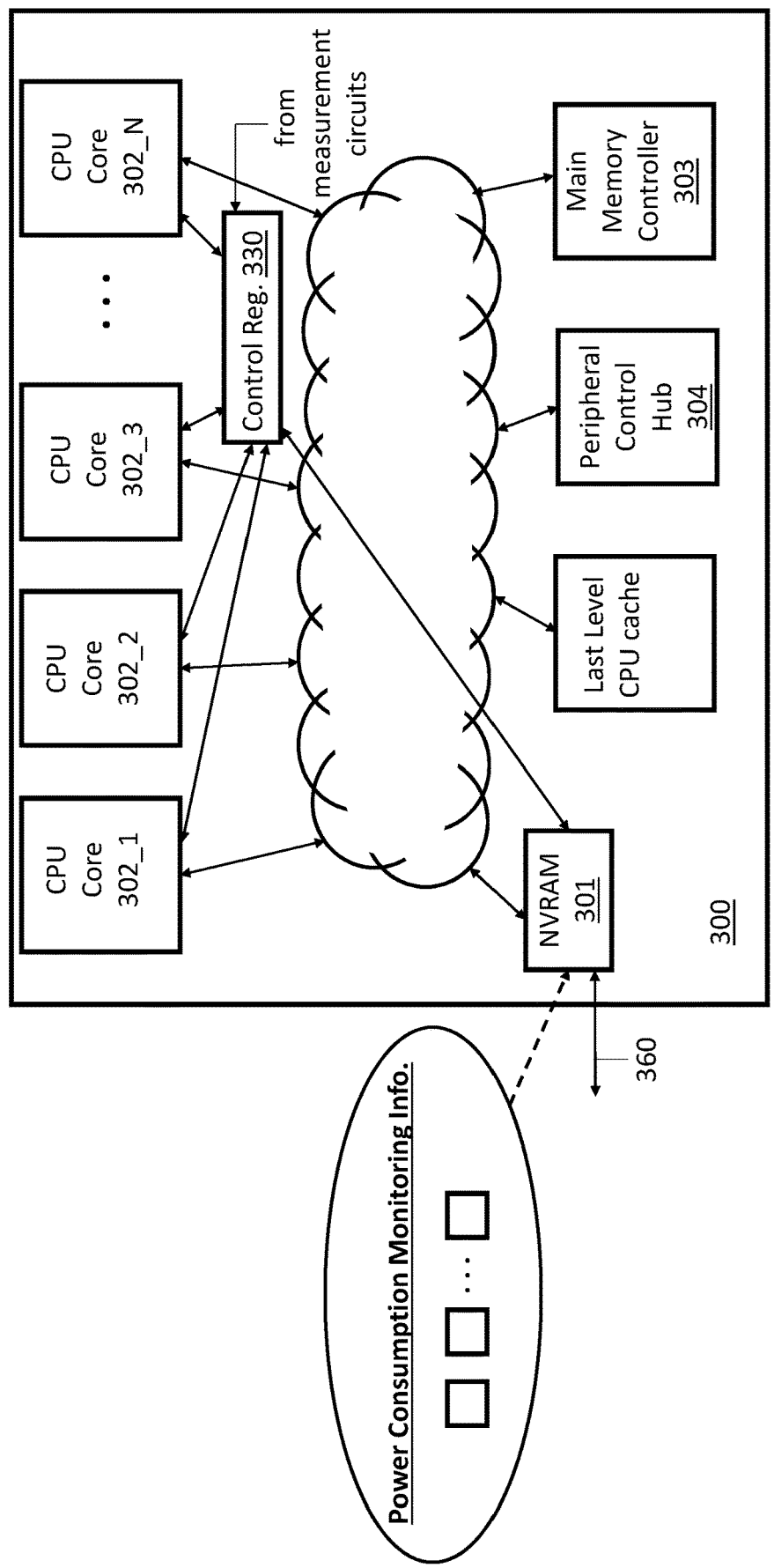
FIG. 3 shows a power consumption monitoring system that uses embedded NVRAM.
Figure 4:
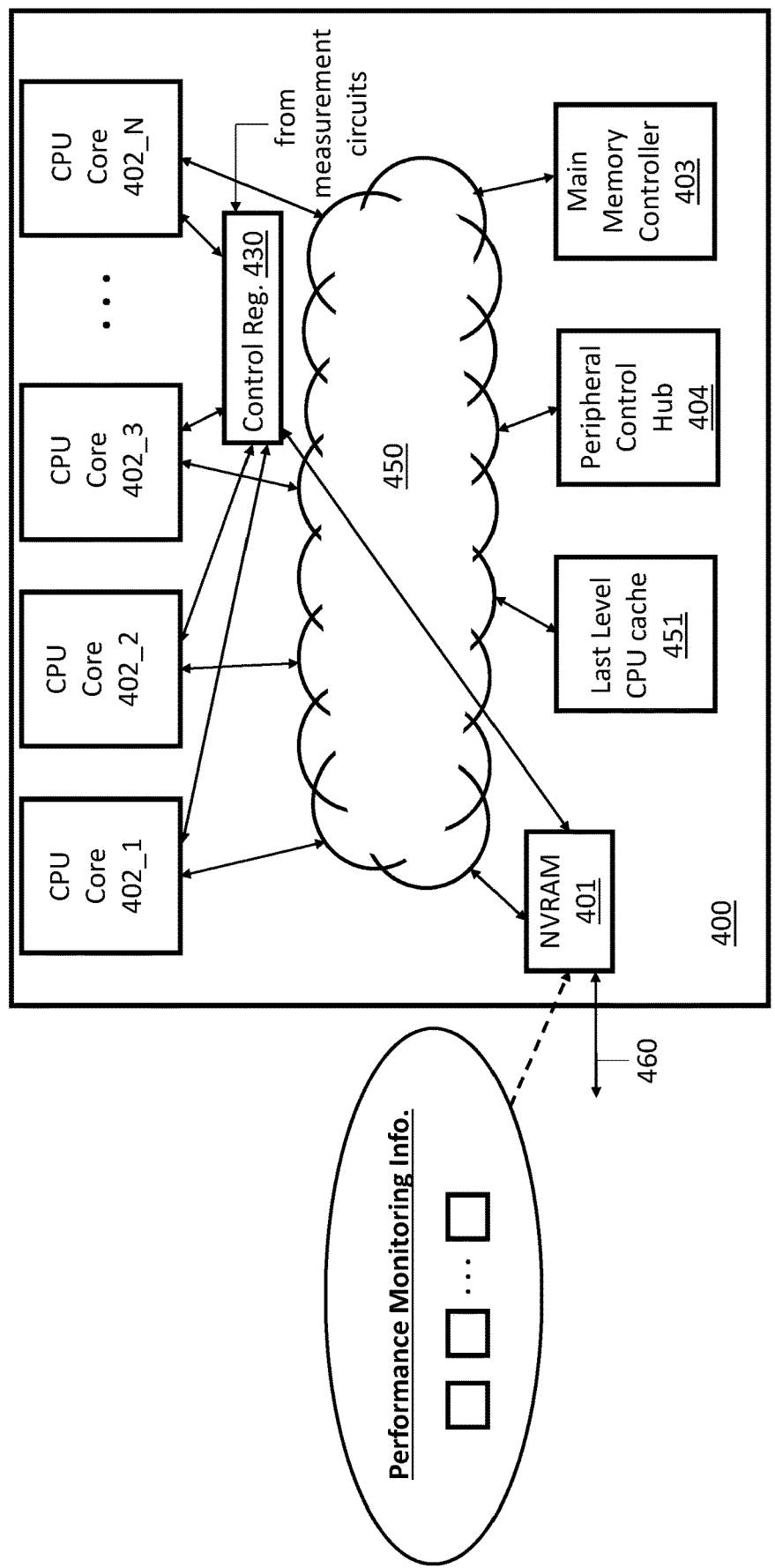
FIG. 4 shows a performance monitoring system that uses embedded NVRAM.

With the processor 100 having embedded (on-die) nonvolatile random access memory 101, a more architecturally compact solution may be realized for any of the run-time reliability analysis, run-time power consumption monitoring and/or run-time performance monitoring routines discussed above. FIGS. 2, 3 and 4 provide high level depictions of such solutions respectively.

FIG. 2 shows a reliability monitoring system in which reliability models 221 and a combining model 222 are kept in the local embedded NVRAM 201 of the processor 200. Here, as is known in the art, degradation of a semiconductor chip can be mathematically modeled from an understanding of its underlying physical mechanisms. For instance, the degradation of a dielectric material can be mathematically modeled from an understanding of the physics of dielectric breakdown or wear-out. In various embodiments, a separate reliability physics model is instantiated for each different physical degradation mechanism to be accounted for in determining the processor's failure rate or expected failure time (e.g., dielectric breakdown, threshold voltage variation, leakage current, intrinsic charge loss, electro-migration, die/package cracking, read disturb (e.g., for external memory devices), etc.). Thus, for instance, a first of the physics reliability models 221 may correspond to a dielectric breakdown model, a second of the physicals reliability models 221 may correspond to a threshold voltage variation model, etc.

In an embodiment, each reliability physics model consists of a digital representation of the mathematical expression(s) used to calculate the degradation for its particular failure mechanism (alternatively the actual equation may be expressed in the reliability software that calculates a characterization of the degradation). Each mathematical expression, as alluded to above, is derived from an understanding of the underlying physics of whatever degradation mechanism it is designed to characterize. Additionally, the expressions may include coefficients or other constants that are determined from parametric data that is collected from the processor chip during its manufacture (e.g., dopant concentrations, material thicknesses/widths, resistances, etc.). Such coefficients are included in their appropriate reliability physics model that is stored in the NVRAM 201.

In various embodiments, the reliability monitoring information also includes a combining model 222. Here, reliability calculations can be made for each of the processor's components individually. That is, for instance, a separate reliability calculation can be made for each individual CPU core 202_1, 202_2, . . . 202_N, the main memory controller 203, the peripheral control hub 204, etc. as well as other components of the processor's larger computing system (e.g., the memory devices of the computer's system memory that is coupled to the main memory controller 203). Each of these reliability calculations may separately determine a failure rate and/or expected failure time for its respective component (e.g., a failure rate and/or expected time of failure for the memory controller 203, a failure rate and/or expected time of failure for the peripheral control hub 204, a separate failure rate and/or expected failure for each of the CPU cores individually, etc.).

Here, the propensity of the failure of any particular component is a function of its stress (how substantially it is used). Moreover, the processor 200 typically also includes power management hardware and/or software that will throttle supply voltages and/or clock frequencies to the different components based on their usage (with components that are enduring greater utilization being provided greater supply voltages and/or clock frequencies and components that are enduring lesser utilization being provided lesser supply voltages and/or clock frequencies). Here, higher supply voltages and higher clock frequencies generally correspond to higher levels of stress and associated degradation.

Because the different components can have varied utilization and correspondingly different stress levels, the different components may exhibit different degrees of degradation and associated failure times. Separate reliability calculations are therefore made, in various embodiments, for each component individually to reflect the fact that the different components may degrade differently based on their utilization.

As such, in various embodiments, the combination model 222 includes digital representations of the mathematical expression(s) for determining the degradation of each processor component individually and makes use of the aforementioned physics reliability models 221 to do so.

The combination model 222 may also include binary representations of expression(s) used for determining an overall failure rate and/or expected time of failure for the processor 200 as a whole from the separate calculations performed for each of the different components individually. For instance, a Markov chain model may be used to express an overall failure rate or expected failure time state of the processor 200 as a whole from the collection of reliability calculations made across the various processor components. Alternatively, at least some of these mathematical expressions may be incorporated in the program code of the reliability software. However, again, coefficients or other values that are determined at time of chip manufacture or measured during processor runtime that such mathematical expressions rely upon are kept in combination model 222.

That is, in order to support calculations for the different components individually the combination model 222 may include monitored data that is specific to each component (e.g., time endurance of specific clock frequencies, time endurance of specific supply voltages, temperature, etc.). Thus whereas the physics reliability models 221 may include static information (equations and parameters that are determined during device manufacture and programmed into the processor), by contrast, the combinatorial model 222 may include dynamic information that tracks/characterizes the usages of the different components over the lifetime of the processor 200.

Regardless, in various embodiments, the digital representations of the mathematical expressions for both the physics reliability models 221 and the combinatorial models 222, the static coefficient values that are programmed into the processor during manufacture and the dynamic usage data that is utilized by the combinatorial model 222 may be kept in the processor's embedded NVRAM 201.

As explained above, the reliability software periodically determines failure rates and/or expected lifetimes for the processor's individual components by calling up the contents of specific ones of the reliability models as needed and then determines an overall failure rate and/or expected lifetime for the processor 200 by calling up the contents of the combination model 222. Results of any calculations that are needed for subsequent calculations are persistently stored back into the embedded NVRAM 201. Notably, because of the locality of NVRAM 201, the time to access the models 221, 222 and the time to persist any data are dramatically reduced as compared to approaches that keep the models and the persisted data off the processor chip.

In various embodiments, the address space of the embedded NVRAM 201 is (at least partially) reserved for the use of the reliability software. That is, the embedded NVRAM 201 may be regarded as a special memory resource, e.g., different than main memory (which is external from processor chip 200 and coupled to main memory controller 203) that the reliability software understands it had permission to access in order to read/write its particular data structures (e.g., any of the contents discussed above for the physics reliability models 221 or the combination model 222).

Thus, in various embodiments, the instruction set architecture of one or more of the processor's CPU cores 202 includes special memory access instructions that target the embedded NVRAM 201 rather than main memory or other memory. As such, in various embodiment, the reliability software executes its respective instructions primarily out of main memory (the program code instructions reside in main memory) but the program code is written to access NVRAM 201 for at least some of its data with a special read instruction that targets the embedded NVRAM 201. In further embodiments, the reliability software is able to write to NVRAM 201 in order to update/persist any such data with another special write instruction that targets the embedded NVRAM 201.

Here, the special nature of a memory access instruction that targets the embedded NVRAM 201 can be designed into the instruction format of the instruction set architecture of the processor's CPU cores 202 with a special opcode or immediate operand that specifies memory access is to be directed to embedded NVRAM 201 rather than main memory. Alternatively, the address space of NVRAM 201 can be viewed as a privileged region of main memory address space. In this case, the NVRAM 201 can be accessed with a nominal memory access instruction but the reliability software has to be given special privileged status to access it. Additionally, note that a nominal memory access instruction is executed that completes entirely on the processor semiconductor chip.

According to various embodiments, any permanent/static equation models and associated coefficients or constants, etc. are programmed directly into the embedded NVRAM 201 as part of the device manufacturing process. As such, each time the processor's larger computing system boots-up, it does not need to load the models and coefficients/constants from BIOS or mass storage. In alternate embodiments, the NVRAM 201 may be loaded from BIOS during system boot-up. Combinations of the two are also possible. For example, reliability model and/or coefficient data for components that are external to the processor 200, such as the main memory devices, may be loaded from BIOS into the embedded NVRAM 201.

FIG. 3 shows a power consumption monitoring system in which run-time measurement data used for determining the processor's power consumption by power consumption software is kept in the embedded NVRAM 301. Note that the power consumption monitoring system of FIG. 3 may co-exist with the reliability monitoring system of FIG. 2 where both system make use of the embedded NVRAM 201/301 (the reliability monitoring system may be provided a first portion of the NVRAM 201/301 and the power consumption monitoring system may be provided a second portion of the NVRAM 201/301).

Notably, power consumption measurements are apt to made more frequently than reliability assessment measurements. That is, whereas reliability assessments may be made periodically (e.g., hourly, daily, weekly), by contrast, the power consumption of the processor may be continuously monitored during the run-time of the processor (or in smaller periodic time increments).

The power consumption of the processor 300 can be determined from explicit measurements of supply voltage and current draw at certain voltage supply nodes within the processor, or can be explicitly calculated from other run-time measurements or some combination thereof. In the case of the later (explicit calculation from run-time measurements), generally, the utilization of any processor component can be correlated to its power consumption. For example, the power consumption of a CPU core 202 over a time window can be correlated to how many instructions it executes over the time window. Likewise, the power consumption of the memory controller 203 over a time window can be correlated to how many memory read/write requests the memory controller 203 receives within the time window.

As such, similar to the reliability calculations discussed above, the power consumption monitoring system may include power consumption models for the individual processor components that contain programmed and/or persisted values for use in calculations that determine a particular component's power consumption. Additionally, a power consumption combining model may also be present to incorporate the power consumption of the various components into a collective model for determining processor power consumption as a whole.

Regardless, as depicted in FIG. 3, special control registers 330 (such as model specific registers (MSRs) in an Intel processor or similar processor) may be reserved for the use of the run-time power consumption determination software. Here, for instance, the supply voltages and/or current draws at one or more specific supply nodes and/or reference nodes within the processor 300, internal temperature readings of the processor 300 and/or certain run-time statistics that are used to calculate power consumption (e.g., a first counter that counts the instructions executed by a first CPU core 302_1, a second counter that counts instructions executed by a second CPU core 302_2, a third counter that counts read requests received by the memory controller 303, a fourth counter that counts write requests received by the memory controller 303, etc.) are reported by the processor's hardware to the special control registers 330.

For example, voltage and/or current measurement circuitry may be coupled to analog-to-digital converters (ADC) which then write to specific register space within control registers 330. Likewise, thermocouple circuits that measure die temperate may be coupled to other specific register space within control registers 330 and counter circuits each of whose count values reflect utilization of specific processor component (e.g., a particular CPU core, the memory controller, etc.) may be coupled to still other specific register space within the control registers 330. The power consumption monitoring software refers to the control registers 330 in order to determine the power consumption of specific processor components, determine the power consumption of the processor as a whole and/or determine the power consumption of components external to the processor (e.g., the main memory devices) so that, e.g., the power consumption of the processor's larger computing system can be determined.

Upon the power consumption software determining specific power consumption results and/or meta-data and/or intermediate data values associated with these calculations (e.g., timestamps), such results/data may likewise be written to specific register space in the control registers 330 so that the software can later refer to them and/or report them to the operating system or virtual machine monitor, e.g., in case of a power related warning flag. Importantly, the content of any/all of these control registers 330 may be persisted (backed-up) to the embedded NVRAM 301. Again, a special instruction may be executed by the software in order to effect the back-up.

That is, for instance, the instruction set architecture of the CPU core(s) that execute the power management software may include the definition of an instruction that reads content from a location within the control registers 330 and writes the content into the NVRAM 301 (to persist the content). The format of the instruction may include as operands both the address of the control register where the data to be moved is located and the NVRAM address where the data is to be written to. Note that the control register may have global visibility to all processor cores. Alternatively, rather than a globally visible control register, a special instruction may commit information in general register space (e.g., that is local to a CPU core and perhaps private to the CPU core) to the embedded NVRAM 301.

In still yet other embodiments, the hardware of the processor may include special logic circuitry to automatically write content of specific control registers to NVRAM thereby avoiding the need to execute an instruction explicitly. Here, such hardware may trigger a data back-up to NVRAM anytime a control register is written to with new data, after a limited number of updates, periodically with a fairly high frequency, etc.

Whether the back-up occurs through instruction execution or automatically in hardware, note that the "time-of-flight" between when new data is first realized in a control register 330 and when the same data is backed up into the embedded NVRAM 301 is very small as compared to other solutions that require same/similar data to be backed up in traditional external non volatile memory or storage. As such, not only is traffic congestion with the main data paths of the system reduced but the likelihood that the data is not safely written into NVRAM 301 before a critical failure occurs extremely unlikely. As such, the embedded NVRAM 301 in most (or most all) scenarios safely contain the last state of its reliability and/or power consumption data just prior to a critical failure. Should the processor suffer a serious immediate failure, the embedded NVRAM 301 of the processor itself will contain the most recent monitoring data for the processor just prior to its failure.

In still yet other embodiments, the control register space 330 is entirely avoided and power consumption related monitoring data is written directly to the embedded NVRAM 301 (rather than control register space 330) by the hardware that internally measures the parameters used to determine the processor's power consumption (e.g., voltage/current measurement circuits and ADCs, thermocouple circuits, counters, etc. are coupled to the NVRAM). Likewise, the power consumption determination software writes its resultants directly to embedded NVRAM (e.g., with a special instruction that accesses NVRAM) rather than to control register space 330.

FIG. 4 shows a processor performance monitoring system. In various embodiments, the performance monitoring system is similar to the power consumption measuring system discussed just above in all respects except that other run-time measurements of the processor are made by the hardware and utilized by the software. For example, in various embodiments, the performance monitoring system measures one or more of the following: 1) instructions per time window for each CPU core; 2) applied clock frequency for each CPU core; 3) processor interconnection network 450 bandwidth/utilization; 3) memory channel bandwidth for each DDR memory channel that stems from the memory controller; 4) number of memory read requests for each memory channel; 5) number of memory write requests for each memory channel; 6) number of memory read requests for the memory controller 403; 7) number of memory write requests for the memory controller; 8) memory controller clock frequency; 8) local cache (L1) hits and misses for each CPU core (each CPU core includes an L1 cache); 9) hits and misses for the last level cache 451; 10) number of outbound requests received by the peripheral control hub 404 from the processor interconnection network 450; 11) number of inbound requests provided by the peripheral control hub 404 to the processor interconnection network 450;, etc.

Here, various circuits that track the appropriate parameters (e.g., counters) write their output values into control register space 430, embedded NVRAM 401 or some combination of both. Statistics that are kept in control register space 430 may also be written back or otherwise persisted into NVRAM 401. The writing/reading of such statistics to/from NVRAM 401 may be performed by way of execution of special instructions (as described above) or may be performed automatically in specialized hardware (at least for writes into NVRAM). Monitoring software that executes on one or more of the CPU cores 402 determines whether the processor is operating correctly, e.g., by comparing the measured statistics values against maximum ceiling levels or minimum floor levels. The monitoring software may access the statistics from the control registers 430, the embedded NVRAM 401 or some combination of both. Any resultant or output data from the monitoring software may be written to control register space 430 or embedded NVRAM 401. Any output data written to control register space 430 may be backed up or otherwise persisted into embedded NVVRAM 401.

The performance monitoring system serves the purpose of not only monitoring processor operation with live statistics but also flagging any processor errors or faulty operation. Here, for instance, error logs that record various processor errors and/or values associated with error messages (e.g., a program counter value) may be written to the embedded NVRAM 401 as part of the error reporting process. The recording of error logs and/or error related values into embedded NVRAM 401 stands in stark contrast to traditional processes which report error logs and error values externally from the processor to, e.g., BIOS non volatile or mass storage. Storing these values to embedded NVRAM 401 should result in faster response times to the errors because downstream reactive processing (which is typically software executing on the processor) has local access to the data.

For failure analysis purposes, the embedded NVRAM 201, 301 401 may also include a "backdoor" port 260, 360, 460 that provides at least for the reading of data from the embedded NVRAM 201, 301, 401 other than by execution of program code by a CPU core of the processor. Here, for instance, the processor may suffer some kind of critical failure that prevents access to the embedded NVRAM by normal mechanisms. With the backdoor port 201, 301, 401 the entire contents of the embedded NVRAM including the last update that the processor was able to successfully write into the embedded NVRAM can still be accessed so that the history of the processor's operation, potentially right up to the moment of failure, can be studied in detail.

Note also that any of the monitoring software programs may include an artificial intelligence structure (e.g., a simulated or emulated neural network) so that some form of machine learning is executed to improve the monitoring functions (e.g., recognize a problem earlier than explicit equations predict). Also, any instructions described above may be compatible with various instruction set architecture (ISA) formats (e.g., Intel x86, ARM, SAM8, IBM Power, NVidia Fermi, etc.) that are associated with the processing core(s) that execute the instruction.

Figure 5:
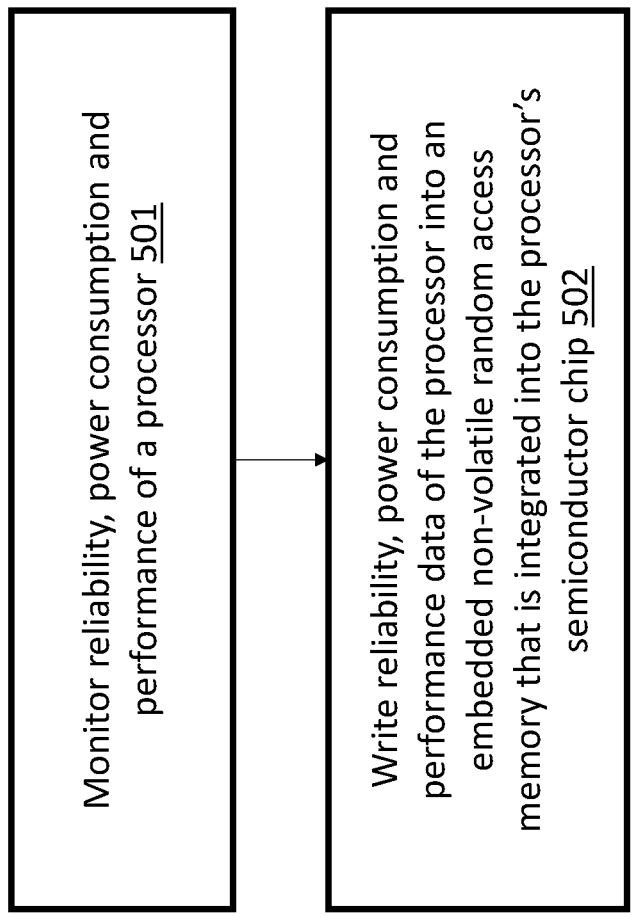
FIG. 5 shows a method for performing

FIG. 5 shows a method described above. The method includes monitoring reliability, power consumption and performance of a processor 501 and writing reliability, power consumption and performance data of the processor into an embedded non-volatile random access memory that is integrated into the processor's semiconductor chip 502.

Figure 6:
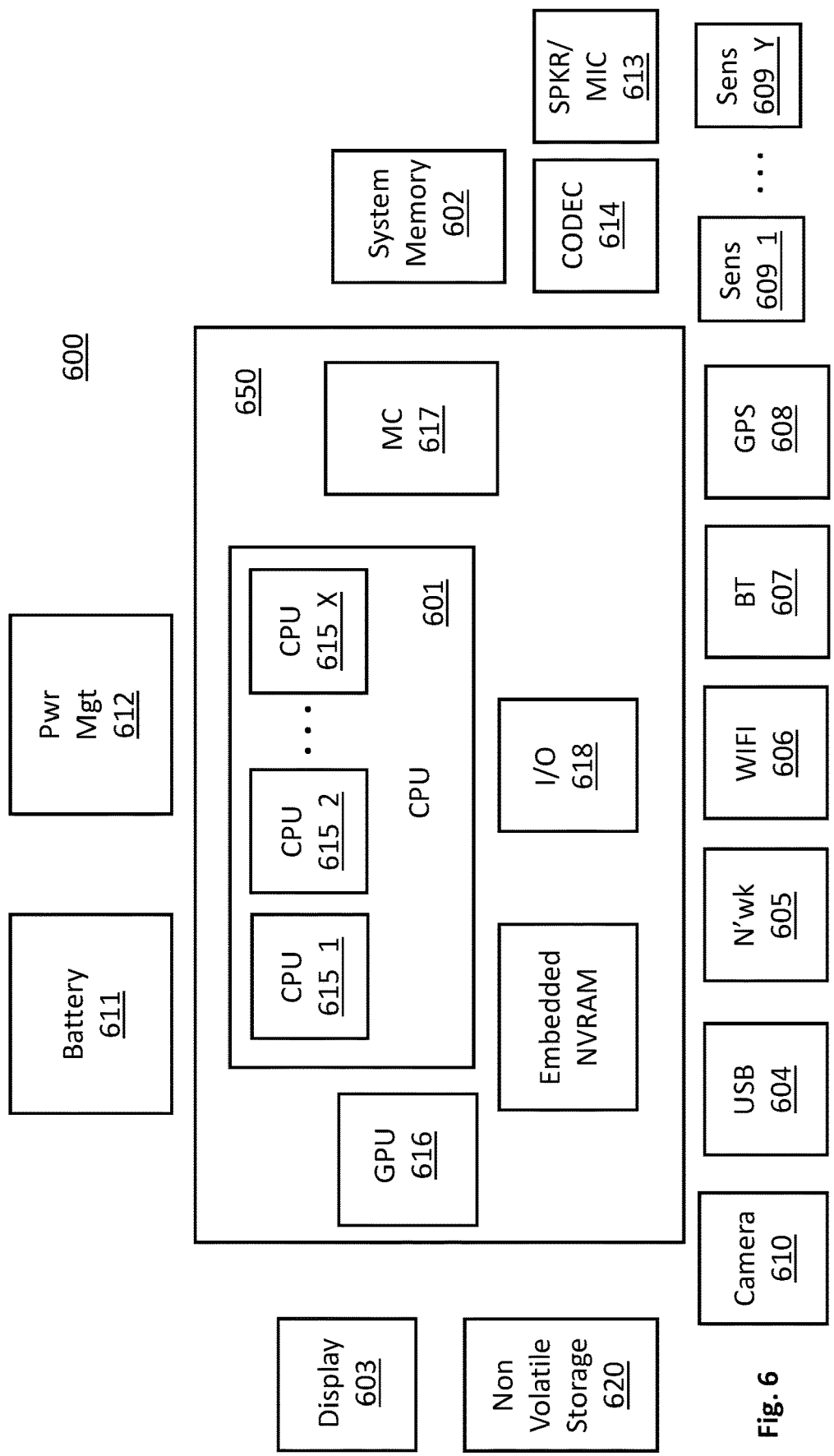
FIG. 6 shows a computing system that can perform various monitoring tasks with embedded NVRAM on a processor semiconductor chip.

FIG. 6 provides an exemplary depiction of a computing system 600 (e.g., a smartphone, a tablet computer, a laptop computer, a desktop computer, a server computer, etc.). As observed in FIG. 6, the basic computing system 600 may include a central processing unit 601 (which may include, e.g., a plurality of general purpose processing cores 615_1 through 615_X) and a main memory controller 617 disposed on a multi-core processor or applications processor, system memory 602, a display 603 (e.g., touchscreen, flat-panel), a local wired point-to-point link (e.g., USB) interface 604, various network I/O functions 605 (such as an Ethernet interface and/or cellular modem subsystem), a wireless local area network (e.g., WiFi) interface 606, a wireless point-to-point link (e.g., Bluetooth) interface 607 and a Global Positioning System interface 608, various sensors 609_1 through 609_Y, one or more cameras 610, a battery 611, a power management control unit 612, a speaker and microphone 613 and an audio coder/decoder 614.

An applications processor or multi-core processor 650 may include one or more general purpose processing cores 615 within its CPU 601, one or more graphical processing units 616, a memory management function 617 (e.g., a memory controller) and an I/O control function 618. The general purpose processing cores 615 typically execute the operating system and application software of the computing system. The graphics processing unit 616 typically executes graphics intensive functions to, e.g., generate graphics information that is presented on the display 603. The memory control function 617 interfaces with the system memory 602 to write/read data to/from system memory 602. The power management control unit 612 generally controls the power consumption of the system 600.

Each of the touchscreen display 603, the communication interfaces 604-507, the GPS interface 608, the sensors 609, the camera(s) 610, and the speaker/microphone codec 613, 614 all can be viewed as various forms of I/O (input and/or output) relative to the overall computing system including, where appropriate, an integrated peripheral device as well (e.g., the one or more cameras 610). Depending on implementation, various ones of these I/O components may be integrated on the applications processor/multi-core processor 650 or may be located off the die or outside the package of the applications processor/multi-core processor 650. The computing system also includes non-volatile storage 620 which may be the mass storage component of the system.

The processor 650 may also include embedded NVRAM as described above to improve overall operation of various monitoring programs that execute on one or more of the CPU cores 615.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hardwired logic circuitry or programmable logic circuitry (e.g., field programmable gate array (FPGA), programmable logic device (PLD)) for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A non transitory machine readable storage medium containing program code that when processed by one or more processing cores of a processor implemented on a semiconductor chip causes a method to be performed, said method comprising:

monitoring reliability, power consumption and performance of the processor;

writing reliability, power consumption and performance data of the processor into an embedded non-volatile random access memory that is integrated into the semiconductor chip, wherein, the embedded non-volatile random access memory also includes respective representations of mathematical expressions for different degradation mechanisms of the semiconductor chip, and, at least one representation of a mathematical expression that combines different respective degradations of different components of the semiconductor chip that result from different respective usages of the different components of the semiconductor chip.

2. The non transitory machine readable storage medium of claim 1 wherein the writing comprises executing a memory write instruction that targets the embedded non-volatile random access memory.

3. The non transitory machine readable storage medium of claim 2 wherein the embedded non-volatile random access memory is expressed as a target of the memory write instruction in at least one of an opcode and an immediate operand of the memory write instruction.

4. The non transitory machine readable storage medium of claim 1 wherein address space of the embedded non-volatile memory is privileged.

5. The non transitory machine readable storage medium of claim 1 wherein the writing comprises reading contents of a control register and writing the contents of the control register into the embedded non-volatile random access memory.

6. The non transitory machine readable storage medium of claim 1 wherein the method comprises reading the reliability, power consumption and performance data from control register space of the processor.

7. The non transitory machine readable storage medium of claim 1 wherein the method comprises reading the reliability, power consumption and performance data from the embedded non-volatile memory.

8. An apparatus, comprising:
a processor comprising:
a) a plurality of processing cores;
b) a main memory controller to interface to a main memory;
c) a peripheral control hub;
d) a embedded non-volatile random access memory, the embedded non-volatile random access memory to store:
i) reliability, power consumption and performance data of the processor;
ii) respective representations of mathematical expressions for different degradation mechanisms of the processor's semiconductor chip, and,
iii) at least one representation of a mathematical expression that combines different respective degradations of different components of the processor's semiconductor chip that result from different respective usages of the different components of the processor's semiconductor chip; and,
e) one or more control registers coupled to the embedded non-volatile random access memory.

9. The apparatus of claim 8 wherein an instruction set architecture of at least one of the processing cores supports an instruction to write data into the embedded non-volatile random access memory.

10. The apparatus of claim 9 wherein the embedded non-volatile random access memory is expressed as the target of the write in at least one of an opcode and an immediate operand of the instruction.

11. The apparatus of claim 8 wherein the embedded non-volatile random access memory is to store physics reliability models for different types of failure mechanisms and a combination model to determine failure rates of different components of the processor.

12. The apparatus of claim 8 wherein the processor comprises logic circuitry to automatically write content of the one or more control registers into the embedded non-volatile random access memory.

13. The apparatus of claim 8 comprising a back-door interface to the embedded non-volatile random access memory.

14. A method, comprising:
monitoring reliability, power consumption and performance of a processor;
writing reliability, power consumption and performance data of the processor into an embedded non-volatile random access memory that is integrated into a processor semiconductor chip. Wherein, the embedded non-volatile random access memory also includes respective representations of mathematical expressions for different degradation mechanisms of the semiconductor chip, and, at least one representation of a mathematical expression that combines different respective degradations of different components of the semiconductor chip that result from different respective usages of the different components of the semiconductor chip;
reading reliability data of the reliability, power consumption and performance data and one or more of the respective representations of the mathematical expressions and the at least one representation of the mathematical expression from the embedded non-volatile random access memory and calculating reliability related information for the processor.

15. The method of claim 14 wherein the writing comprises executing a memory write instruction that targets the embedded non-volatile random access memory.

16. The method of claim 15 wherein the embedded non-volatile random access memory is expressed as the target of the memory write instruction in at least one of an opcode and an immediate operand of the memory write instruction.

17. The method of claim 14 wherein address space of the embedded non-volatile memory is privileged.

18. The method of claim 14 wherein the writing comprises reading contents of a control register and writing the contents into the embedded non-volatile random access memory.

19. The method of claim 14 wherein the method comprises reading the reliability, power consumption and performance data from control register space of the processor.

20. The method of claim 14 wherein the method comprises reading the reliability, power consumption and performance data from the embedded non-volatile memory.

* * * * *